Patented Sept. 5, 1922.

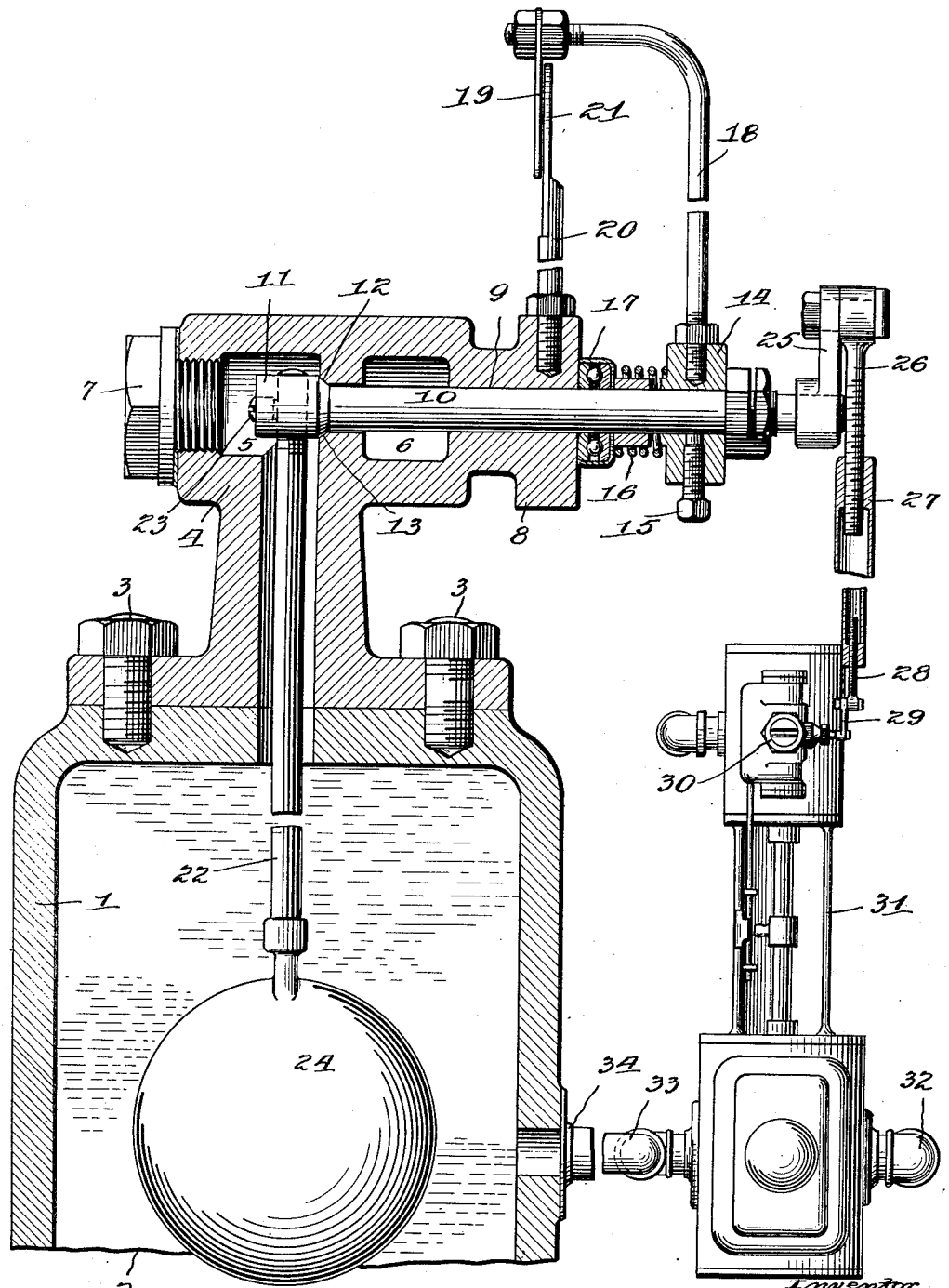

1,427,793

UNITED STATES PATENT OFFICE.

VICTOR LEE EMERSON, OF PHILADELPHIA, PENNSYLVANIA.

LIQUID-LEVEL-CONTROLLING DEVICE FOR BOILERS OR STILLS.

Application filed May 12, 1921. Serial No. 468,998.

*To all whom it may concern:*

Be it known that I, VICTOR LEE EMERSON, a citizen of the United States, residing at Philadelphia, county of Philadelphia, and State of Pennsylvania, have invented certain new and useful Improvements in Liquid-Level-Controlling Devices for Boilers or Stills, of which the following is a specification.

While this invention relates broadly to a means for controlling the liquid level in a container to which the liquid is supplied and removed during operation of the apparatus, it relates more specifically to a mechanism for automatically controlling the level of a liquid in a boiler or still.

The invention has for an object the provision of means which will be responsive to a change of liquid level and will be actuated in such a manner as to control the supply of liquid to the boiler or still and keep the level of the liquid substantially constant.

In the embodiment of my invention, herein shown, the figure is a plan view partly in section.

Reference numeral 1, represents the boiler or still which is shown in section, a part of which is broken away as indicated at 2. Secured to the boiler 1, by means of bolts 3 is a flanged casing 4. Within the casing 4, are formed chambers 5 and 6. An opening leading into the chamber 5, to facilitate assembly is closed by a removable screw plug 7. Casing 4, is provided with an extending portion 8, which is provided with a passage 9, for the insertion of a rotatable rod 10. The rod 10, is provided with a head 11 at its inner end, having a portion 12 formed so as to constitute a closure member at the inner end of the passage 9. When operating under high temperature it has been found desirable that the rod 10, be composed of non-corrosive heat resisting material. The casing 4, is so constructed opposite the portion 12 of the head 11, as to form a valve seat co-operating with the portion 12 of the head 11 as shown at 13. The rod 10 is provided at its outer end with a collar 14 which is held in place thereon by a set screw 15. The rod 10, is urged outwardly by a coil spring 16 which is placed between the collar 14 and a ball bearing 17 which surrounds the rod 10 and abuts the extension 8 as shown. By this mechanism the valve 12 is tightly pressed to its seat 13. The pressure of the spring 16, may be regulated by an adjustment of the collar 14. This adjustment is effected by a nut as shown. Mounted on the collar 14 is an arm 18, carrying at its outer end a pointer 19. Mounted on the extension 8 is an arm 20, carrying at its outer end a dial 21. The rotary movement of the rod 10, by this construction, is registered on the dial 21 by the pointer 19.

The head 11, is counterbored, as shown, for the reception of an arm 22, which is held in place by a set screw 23. The outer end of the arm 22 carries a float 24, adapted to rest upon and partake of the movement of the liquid in the boiler or still 1. The outer end of the rod 10 carries an arm 25, to which is pivoted a threaded rod 26. A threaded connecting link 27 connects the rod 26 with a threaded rod 28. The rod 28 is pivoted to an arm 29, mounted upon the stem of a throttle valve 30. By turning the connecting link 27 adjustment may be effected between the arms 25 and 29.

A throttle valve 30 controls the supply of steam to a steam operated pump indicated generally by the reference numeral 31. It will be understood that while a steam operated pump is shown, in the present instance, it is within the scope of my invention to employ any suitable power for operating a pump and the arm 29 may be utilized to operate the means controlling the motive power driving the pump or may control a supply of liquid under pressure. The inlet to the pump is shown at 32, and the outlet at 33. The outlet from the pump leads into the boiler at 34 where it discharges the liquid supply. The pump in the drawing is shown reduced in size and broken away from the other structure.

The operation is as follows:—The float 24 resting upon the liquid in the boiler or still 1, is moved by reason of a rise or fall in the level of liquid so as to rotate the rod 10 by means of the arm 22. The liquid level is indicated by the pointer 19 on the dial 21 by reason of the fact that the movement of the pointer is controlled through the intermediate mechanism by the movement of the float 24, which rests upon the liquid in the boiler or still. The arm 25 partakes of the rotation of the rod 10 and the rotation of the arm 25 imparts a rotative motion to the arm 29 through the elements 26, 27 and 28 The rotative motion of the arm 29 imparts a rotative motion to the throttle valve 30 on whose spindle it is mounted and in this manner controls the supply of steam to the steam pump 31.

If the level of the liquid in the boiler or still 1, should fall the throttle valve 30 would be moved in the direction of opening and on the other hand, if the liquid level should rise the throttle valve would be moved in the direction of closing. Thus the liquid in the boiler or still is kept at the desired level.

What I claim is:

1. In a device of the character described, a liquid container, means within said container responsive to the level of liquid therein, a casing mounted on said container, said casing having a chamber therein communicating with said container and a passage extending from said chamber outwardly through said casing, a movable element mounted in said casing and extending through said passage, said movable element being provided with a portion forming a closure between said chamber and passage, means for connecting said means responsive to the liquid level with said movable member, and means for retaining the closure portion of said movable element in a closed position.

2. In a device of the character described, a liquid container, means within said container responsive to the level of liquid therein, a casing mounted on said container, said casing having a chamber therein communicating with said container and a passage extending from said chamber outwardly through said casing, a movable element mounted in said casing and extending through said passage, said movable element being provided with a portion forming a closure between said chamber and passage, means for connecting said means responsive to the liquid level with said movable member and resilient means acting upon said movable element whereby said closure portion of said movable element is maintained in a closed position.

3. In a device of the character described, a liquid container, a float within said container, a casing mounted on said container, said casing having a chamber therein communicating with said container and a passage extending from said chamber outwardly through said casing, a rotatable rod extending from said chamber through said passage and outwardly of said casing, an arm connecting said float with said rod within said chamber, said rod having a head contacting with said casing and forming therewith a closure member between said chamber and said passage.

4. In a device of the character described, a liquid container, a float within said container, a casing mounted on said container, said casing having a chamber therein communicating with said container and a passage leading from said chamber outwardly through said casing, a rotatable rod extending from said chamber through said passage and outwardly of said casing, an arm connecting said float with said rod within said chamber, said rod having a head contacting with said casing and forming therewith a closure member between said chamber and said passage, an adjustable collar mounted on the outer end of said rod and a resilient means between said casing and collar adapted to force said rod outwardly whereby said head is forced in contact with said casing.

5. In a device of the character described, a liquid container, a float within said container, a casing mounted on said container, said casing having a chamber therein communicating with said container and a passage leading from said chamber outwardly through said casing, a rotatable rod extending from said chamber through said passage and outwardly of said casing, an arm connecting said float with said rod within said chamber, said rod having a head contacting with said casing and forming therewith a closure member between said chamber and said passage, an adjustable collar mounted on the outer end of said rod and a resilient means between said casing and collar adapted to force said rod outwardly whereby said head is forced in contact with said casing, an arm having a pointer at the outer end thereof mounted on said collar and a dial mounted on said casing in such a position as to permit said pointer to indicate thereon the position of said float and liquid level.

6. In a device of the character described, a liquid container, a casing mounted on said container, said casing having a chamber therein, communicating with said container a passage extending from said chamber outwardly through said casing, said casing having an opening therein into said chamber opposite said passage, a closure member for said opening, a rod adapted to be inserted through said opening and extending from a point within said chamber through said passage to a point without said casing forming a closure member between said chamber and passage.

In testimony whereof, I have signed my name to this specification in the presence of two subscribing witnesses, this third day of May 1921.

VICTOR LEE EMERSON.

Witnesses:
ANNA R. LYNCH,
FLORENCE A. COPE.